United States Patent [19]

Bowen et al.

[11] 4,389,672
[45] Jun. 21, 1983

[54] DISPLAY OF PSEUDO-GRAY SCALE PICTURE SIGNALS ON MULTILEVEL DISPLAYS

[75] Inventors: Edward G. Bowen, Laurence Harbor; Arun N. Netravali, Westfield, both of N.J.

[73] Assignee: Bell Telephone Laboratories, Incorporated, Murray Hill, N.J.

[21] Appl. No.: 230,458

[22] Filed: Feb. 2, 1981

[51] Int. Cl.³ .................................................. H04N 7/12
[52] U.S. Cl. ...................................... 358/160; 358/133; 358/240
[58] Field of Search ............... 358/160, 133, 138, 166, 358/169, 230, 240, 241, 260, 283; 340/146.3 H, 146.3 MA, 146.3 Y, 146.3 CA

[56] References Cited

U.S. PATENT DOCUMENTS

| | | | |
|---|---|---|---|
| 3,953,668 | 4/1976 | Judice | 358/240 |
| 3,976,826 | 8/1976 | Fulton, Jr. | 358/160 |
| 3,997,719 | 12/1976 | Judice | 358/240 |
| 4,124,870 | 11/1978 | Schatz | 358/260 |
| 4,255,763 | 3/1981 | Maxemchuk et al. | 358/133 |
| 4,266,249 | 5/1981 | Chai et al. | 358/133 |

OTHER PUBLICATIONS

Techniques for Coding Dithered Two-Level Pictures, by Netravali, The Bell System Technical Journal, vol. 56, No. 5, May–Jun. 1977, pp. 809–819.

Primary Examiner—Tommy P. Chin
Attorney, Agent, or Firm—Barry H. Freedman

[57] ABSTRACT

A pseudo-gray scale signal obtained by comparing the intensity values of elements of a picture with a series of spatially dependent threshold values is processed for display on a multilevel device. Generally, an estimate of the intensity value of each pel is formed as a joint function of the display words which make up the pseudo-gray scale signal and an indication of the threshold value associated with the pel. In one embodiment, the display words and threshold values are used to select appropriate stored intensity values obtained from representative pictures. Alternatively, the estimates are derived recursively using display words and threshold values for a neighborhood near the pel being processed.

23 Claims, 4 Drawing Figures

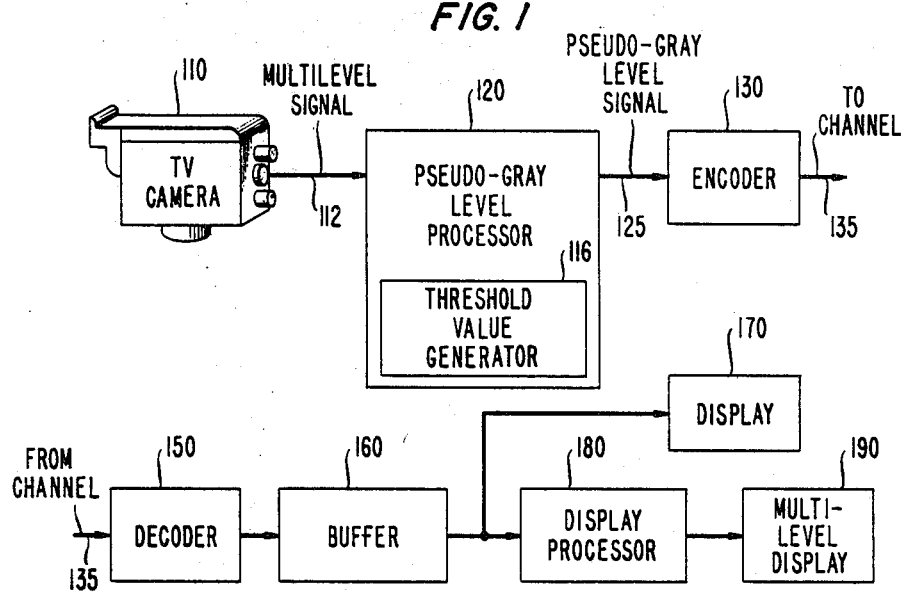
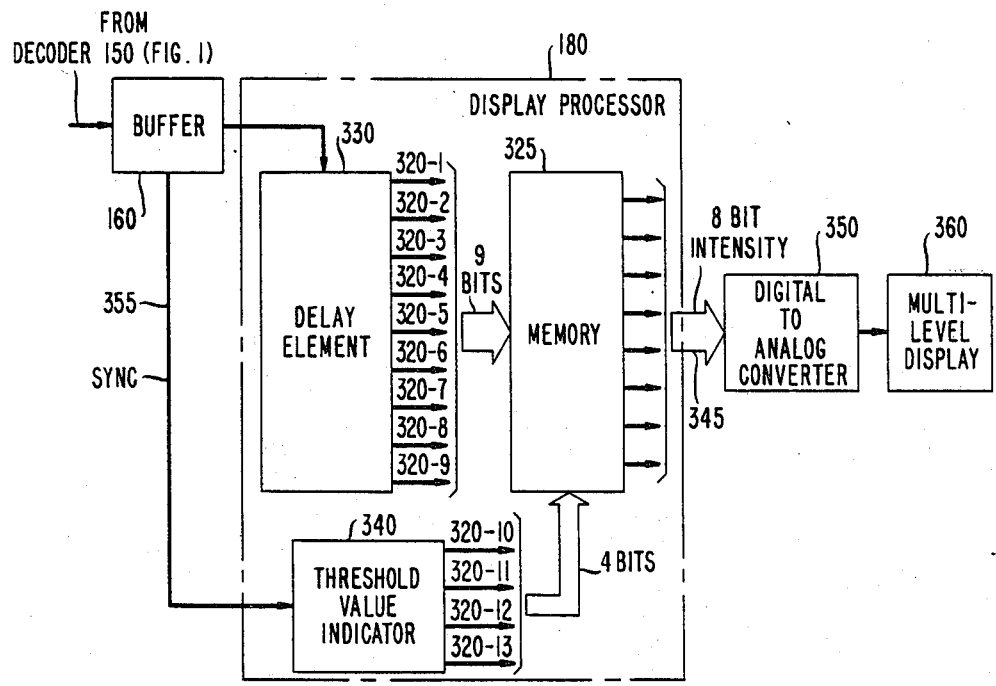

FIG. 2

|   | A | B | C | D | E | F | G |
|---|---|---|---|---|---|---|---|
| 1 | 62/8 | 64/136 | 48/40 | 64/168 | 55/8 | 39/136 | 35/40 |
| 2 | 60/200 | 73/72 | 34/232 | 52/104 | 58/200 | 52/72 | 38/232 |
| 3 | 62/56 | 64/184 | 39/24 | 64/152 | 74/56 | 57/184 | 50/24 |
| 4 | 71/248 | 50/120 | 45/216 | 71/88 | 74/248 | 79/120 | 53/216 |
| 5 | 62/8 | 71/136 | 43/40 | 69/168 | 48/8 | 76/136 | 62/40 |
| 6 | 62/200 | 78/72 | 52/232 | 43/104 | 55/200 | 46/72 | 88/232 |

201

DISPLAY OF PSEUDO-GRAY SCALE PICTURE SIGNALS ON MULTILEVEL DISPLAYS

TECHNICAL FIELD

This invention relates generally to processing of pictorial information and, in particular, to display of pseudo-gray scale picture signals on a multilevel display.

BACKGROUND OF THE INVENTION

Display media such as plasma panels, liquid crystal displays as well as ink on paper have been used to display continuous tone pictures using a variety of techniques which transform a multilevel signal representing the intensity values of an original picture into a pseudo-gray scale signal in which only a small number of levels are used to represent the intensity of each picture element (pel). In general, these techniques take advantage of the spatial low-pass filtering that occurs in the human visual system to achieve an illusion of a gray-scale rendition, even though each cell or display site within the display device is capable of residing only in a limited number of states. This is done by controlling the proportion or density of display cells in a given neighborhood that are in each state, in accordance with the intensity values of picture elements (pels) in the corresponding region in the picture. U.S. Pat. No. 3,997,719 issued to C. N. Judice describes one specific pseudo-gray scale display technique which has found acceptance, particularly in connection with plasma panel displays, in which each display cell is capable of residing in one of two possible states, namely, fully "on" (energized) or fully "off" (deenergized). With this technique, called "ordered dither", a series of multilevel samples which represent the intensity values of elements in the picture to be displayed are compared to a series of position dependent threshold values which form a dither matrix, to generate a one-bit "display word" for each picture element. Each spatially corresponding cell in the bilevel display is then energized in accordance with its appropriate display word. For example, if the one-bit display word is a "one", this is taken to mean that the intensity exceeds the threshold value, and the cell is turned "on". Conversely, a display word of "zero" indicates that the intensity falls below the threshold, and the cell is maintained in an "off" state. The same dither matrix is generally repeated numerous times throughout the entire display area. Each individual matrix includes a plurality of different threshold values which lie within a range determined by the maximum and minimum intensity values which can be assumed by the input signal. Advantageously, the threshold values are distributed within each dither matrix so as to achieve maximum spacing between numerically successive values.

While the n-bit display words which form the pseudo-gray scale signal are primarily intended for use with a display device in which each display site can exhibit only a limited number of intensity values, it is sometimes desirable to utilize a multilevel or continuous display medium such as a CRT for display purposes. In this event, the most straightforward approach is to convert each n-bit display word to one of $2^n$ arbitrarily chosen intensity values which lie within the range of values which can be displayed, depending solely upon the value of the n-bit word. This approach, of course, does not utilize the full range of intensities that may be displayed by the CRT, nor does it take into account information which may be obtained from knowledge of the threshold value used to form the display word. It also often leads to undesirable instability or flicker, particularly where the CRT uses an interlaced-field format. In this format, each frame is formed from two fields each having half of the total number of lines desired. The lines from consecutive fields alternate, with one field including odd numbered lines and the next including even numbered lines. Flicker occurs because adjacent lines in a frame have different threshold values which often cause a noticeable difference in brightness.

One technique designed to avoid flicker when it is desired to display a pseudo-gray scale signal such as an ordered dither signal on a multilevel device is described in U.S. Pat. No. 3,953,668 issued to C. N. Judice. Here, the one-bit display words for a group of N picture elements in the neighborhood of the pel being processed are numerically averaged. Each of the N possible averages is assigned one of N different intensity values within the range of values capable of being displayed. Since this procedure tends to smooth or filter the bilevel signal, the flicker is removed. However, the resulting display is blurred, and information is lost in the averaging process. Also, the full capability of the multilevel display is not realized, because the number N of possible different average values is determined solely by the size of the neighborhood used for averaging.

In view of the foregoing, it is the broad object of the present invention to permit improved display of a picture signal which has been processed using a pseudo-gray scale algorithm on a device capable of displaying a large number of different levels. Specific objects are to fully utilize the gray scale capabilities of the display and to avoid blurring of the picture.

SUMMARY OF THE INVENTION

The foregoing and other objects are achieved in accordance with the present invention by a technique which assigns to each element of a picture which has been processed using a pseudo-gray level technique an estimated intensity value which can be displayed on a multilevel display. The multibit intensity value is estimated as a function of both (1) the value of the display words for the picture elements being processed and for surrounding pels, and (2) the spatial location of the present pel within the threshold value matrix.

In one embodiment, the display words for pels in a neighborhood surrounding the presently processed pel and the spatial position of the pel in the threshold value matrix are used to define a plurality of different "states" which serve as the address inputs to a memory. The contents of the memory at each address is an average of several input intensity values which were found to produce the same state (address) using a set of representative pictures. In a second embodiment, an intensity value is derived for each picture element using a recursive technique which considers both the values of the display words and the threshold value for each pel in a neighborhood surrounding the pel. The technique assigns the most significance to pels nearest to the present pel, and assumes a uniform intensity through the neighborhood. An initial range of possible intensity values is first established, and both the value of the display word for the present pel and the threshold value used to obtain that word are used to narrow the range so as to bracket the desired intensity value. The range is successively narrowed, as each of the threshold values and display words for the remaining pels in the neighborhood are processed, and a final intensity value is selected within this narrowed range.

BRIEF DESCRIPTION OF THE DRAWING

The foregoing and other features and advantages of the present invention will be more fully appreciated by consideration of the following detailed description when read in light of the accompanying drawing in which:

FIG. 1 is a block diagram of a pseudo-gray level picture processing system in which the present invention is used;

FIG. 2 illustrates the threshold and intensity values of a portion of a picture which may be processed in accordance with the present invention;

FIG. 3 is a block diagram of one embodiment of a processor constructed in accordance with the present invention for conditioning a pseudo-gray scale picture signal for display on a multilevel device.

DETAILED DESCRIPTION

Figure 4:
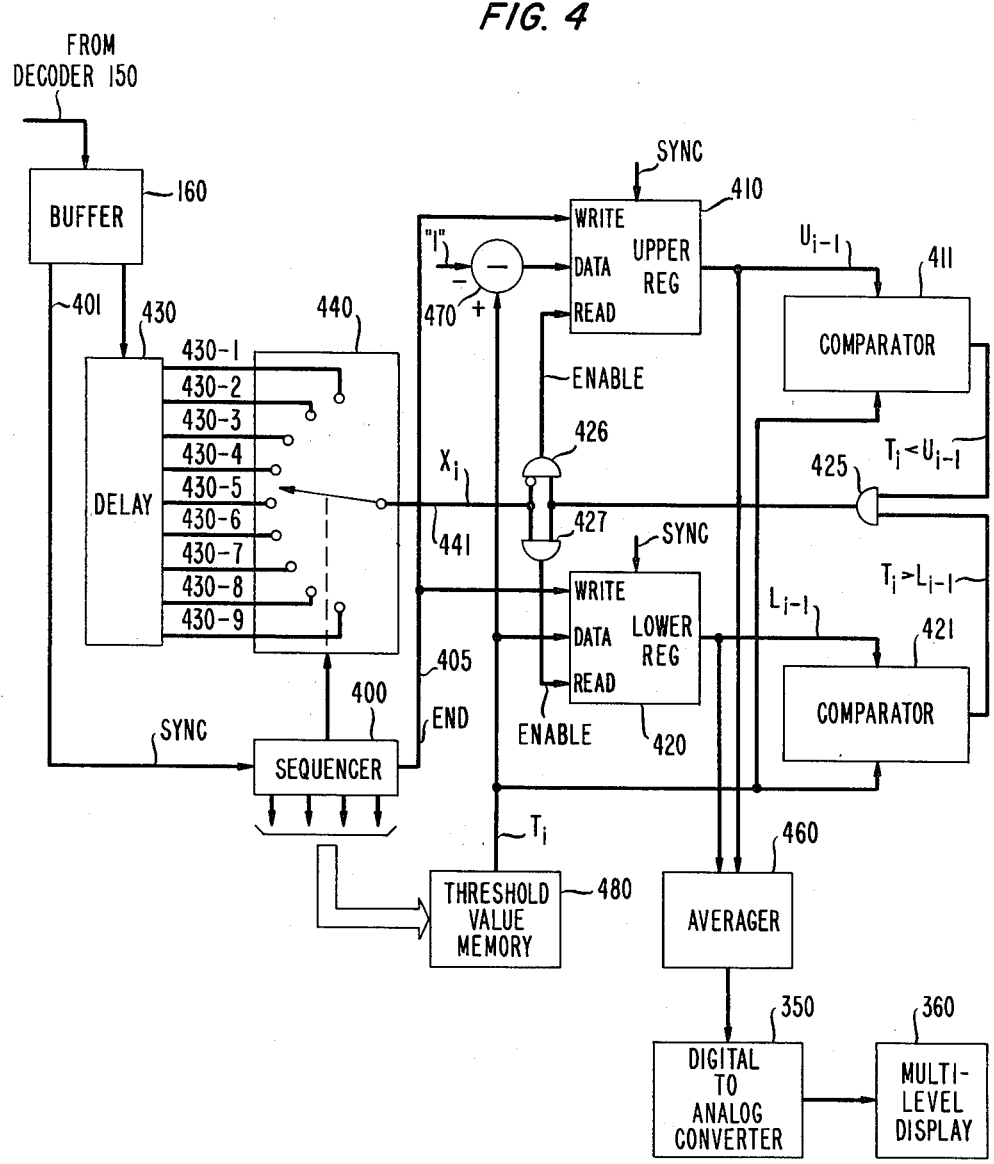
FIG. 4 is a block diagram of a second embodiment which may be used in lieu of the arrangement of FIG. 3.

A pseudo-gray level picture processing system in which the present invention is used is shown in block diagram form in FIG. 1. An image of the object or picture to be encoded is scanned by a camera 110 which provides a signal on line 112 representing the image intensity or gray level. Scanning is conventionally accomplished in a rasterlike fashion along a series of generally parallel lines, each of which proceeds from left to right, with the lines extending from the top of the picture to the bottom. As an example, scanning in accordance with scan broadcast (NTSC) television standards and sampling at a rate of approximately 8 MHz results in division of each scan line into 512 picture elements or pels. A digital representation of the intensity value or gray level for each pel is usually obtained by quantizing each sample to an integral value that falls within a desired numerical range. For example, a range from 0 to 255 can represent desired gradations from black to white, respectively, and can be expressed by an 8-bit word.

Each word in the intensity signal on line 112 is applied to a pseudo-gray level processor 120, which includes a threshold value generator 116 arranged to provide a series of words representing position dependent threshold values. The principal function of processor 120 is to generate a series of display words on output line 125, each of which represents the relationship between the intensity of an element of the picture being processed and the threshold value corresponding to that pel. Normally, a single threshold value is associated with each pel, and the display word for that pel is a single bit. For example, if a threshold is exceeded, a high or "one" bit is provided on line 125, while a low or "zero" bit indicates that the threshold is not exceeded. However, in certain circumstances described more fully below, several threshold values can be associated with each pel, in which case a multibit display word is used to indicate the relative values of the intensity value and the different thresholds. The order in which the display words are output from processor 120 corresponds to the order in which the original image was scanned, preserving the spatial correlation necessary to display the image on a bilevel or other display device.

The display words output from processor 120 are applied to an encoder 130, which compresses the pseudo-gray level signal in any of several well-known ways prior to its application to a transmission channel 135. Encoder 130 may use run length coding techniques, predictive encoding, or any other technique which is well suited to encoding of such signals. However, it is to be noted that much of the spatial redundancy contained in the original image has been intentionally destroyed by the pseudo-gray level processing, and that special encoding steps may be desirable.

The compressed pseudo-gray level signal transmitted via channel 135 is applied to a decoder 150 which recovers the display words and enters them in a one word/pel buffer 160. The decoding process is the inverse of that used in encoder 130, and the sequence of the data entered in buffer 160 is again preserved to maintain spatial correspondence with the original picture. Normally, the output of buffer 160 is applied to a display device 170, such as a plasma panel which includes a plurality of display sites or cells which can display a small number of different intensity values determined in accordance with the display word. In the case of a one bit display word and a bilevel display, each cell is turned "on" if the display bit representing the corresponding element in the picture is a "one". Otherwise, the cell is maintained in the "off" condition. However, in accordance with the present invention, the pseudo-gray level signal output from buffer 160 is also applied to a display processor 180, which conditions the signal for display on a multilevel display 190 such as a cathode ray tube (CRT).

Display processor 180 of the present invention uses both the display words which make up the pseudo-gray level signal stored in buffer 160 and information derived using the threshold value matrix employed in processor 120 to generate an estimated intensity value for each picture element to be displayed on multilevel display 190. Information relating to the threshold value matrix may be communicated to processor 180 via channel 135 before processing is begun, or otherwise entered and stored in a memory device within the processor circuit. The information may be the threshold values themselves or data derived by applying the values to representative pictures. While it may be desirable in some circumstances to change the threshold values for each frame or for a series of frames, it is contemplated that in most cases the same set of threshold values will be used throughout a given cycle to display one or more pictures.

Before proceeding further with a description of display processor 180, the thresholding process used in processor 120 will be described using the ordered dither technique of the above-cited Judice U.S. Pat. No. 3,953,668 as an example. Referring to FIG. 2, a portion 201 of the image scanned by camera 110 is divided into a plurality of picture elements by sampling the intensity signal at a desired rate. For convenience, the pels are referred to in accordance with their position on one of a number of scan lines 1, 2, 3, ... 6 and by their position A, B, C ... G along the line. Exemplary intensity values are shown in the upper-lefthand corner of each pel, it being assumed that these values can range between 0 (totally white) and 255 (totally black). It is to be observed that the values do not differ greatly, since local areas in most pictures are typically flat. Of course, where edges do occur, sharp transitions in intensity are expected. A simple threshold value is shown in the lower-righthand corner of each pel; for example, pel D4 has a threshold value of 88 (and an intensity value of 71). The threshold for a particular pel depends upon its position within one of a plurality of 4-by-4 matrices, such as the matrix 230 (shown within dotted lines) which repeat throughout the entire picture in both the horizontal and vertical directions. Within each matrix, the value of each threshold falls within a range no larger than that defined by the maximum and minimum possible intensity values. In matrix 230, an even smaller range (8–248) is used. Advantageously, the spacing between numerically successive threshold values is maximized, so that in the ensuing processing, clusters of pels which would otherwise be all "on" or all "off" are broken up to give the desired illusion of a gray scale rendition. In FIG. 2, the pels for which the intensity exceeds the corresponding threshold value are indicated by a heavy outline; the value of the display word output from processor 120 of FIG. 1 for these pels is a "one". For the remaining pels, the intensity value falls below the threshold and a display word of value "zero" is generated. As noted previously, the signal output from processor 120 after encoding, transmission and subsequent decoding, determines, for each pel, the status of the spatially corresponding cell in display 170.

In accordance with the present invention, the one-word per pel pseudo-gray level signal output from buffer 160 is converted to a multibit intensity value suitable for use with a multilevel display, in display processor 180, one embodiment of which is shown in greater detail in FIG. 3. In the following description, it is assumed that a single threshold value is associated with each pel, and that each display word thus has one bit, sometimes referred to as a display bit. At the heart of processor 180 is a memory 325 which may be a programmable read-only memory (PROM) capable of storing 8192 different 8-bit words. A desired one of the stored words is read out of memory 325 by energizing or selecting appropriate ones of the thirteen address inputs numbered 320-1 to 320-13. Nine of the address inputs, in this embodiment, are derived from a delay element 330, while the remaining inputs come from a threshold value indictor 340. The function of delay element 330, which may be a tapped delay line, is to simultaneously make available on address inputs 320-1 to 320-9 display bits in the pseudo-gray level signal which were derived from picture elements in a neighborhood which surrounds the pel presently being processed. For example, dotted box 240 in FIG. 2 includes a 3-by-3 neighborhood centered at pel D3, which includes pels C2, D2 and E2 on the previous scan line, pels C3, D3 and E3 on the present line, and pels C4, D4 and E4 on the succeeding line. The total delay capacity of delay element 330 in this example is 2 ($T_L+T_p$), where $T_L$ is the time needed to scan each line and $T_p$ is the time needed to scan each pel. This insures that the bit associated with pel E4 is at the output of delay element 330 when the bit associated with pel C2 appears at its input. Appropriate selection of the remaining taps of element 330 insures that the desired display bits are applied to the remaining address inputs. When pel D3 is being processed, the 9-bit "word" present on inputs 320-1 through 320-9 is 000101000; when the next pel E4 is being processed, its 3-by-3 neighborhood produces an input "word" given by 000010000.

The remaining address inputs 320-10 to 320-13 to memory 325 are derived from threshold value indicator 340, which provides a code word that indicates which threshold values were used in the formation of the display bits associated with the pels in the neighborhood being processed. One 4-bit code word is used, rather than the 8-bit threshold values themselves, since this word is sufficient to uniquely identify which one of the 16 different threshold values corresponds to the presently processed pel. The remaining 8 threshold values for the other pels in the neighborhood are then known (deductively) since they are formed in a fixed spatial pattern or matrix. To insure that the appropriate code word is generated, indicator 340 is synchronized with the rate at which the pseudo-gray level signal is output from buffer 160 by a sync pulse received on line 355. If a threshold matrix other than the 4-by-4 dither matrix depicted in FIG. 2 is used, a different set of (perhaps longer) code words may be constructed.

To illustrate, when an intensity value for pel D3 is being determined, the threshold used in processor 120 was 152, and a 4-bit code word 0110 generated in indicator 340 uniquely indicates this value. When the next pel is being processed, the code word applied to address inputs 320-10 to 320-13 is 0111. The remaining 14 different threshold values may be indicated by yet other 4-bit code words, as in the following table:

TABLE 1

| Code Word | Threshold |
|---|---|
| 0000 | 72 |
| 0001 | 232 |
| 0010 | 104 |
| 0011 | 200 |
| 0100 | 184 |
| 0101 | 24 |
| 0110 | 152 |
| 0111 | 56 |
| 1000 | 120 |
| 1001 | 216 |
| 1010 | 88 |
| 1011 | 248 |
| 1100 | 136 |
| 1101 | 40 |
| 1110 | 168 |
| 1111 | 8 |

For the code arrangement shown above, threshold value indicator 340 may be a 4-bit counter which is initialized by the sync pulse at the beginning of each scan line. For the first line, the initialization value is 0000, while the values 0100, 1000 and 1100 are used for initialization at the beginning of the second, third and fourth scan lines, respectively. Within each line interval, the counter is arranged to increment by "one" for each successive bit, and to reset to the initial value after every fourth increment.

The 13-bit word that is applied to the address inputs of memory 325 indicates one of $2^{13}=8192$ different "states" which completely define the status of both the display bits and the threshold values in a 3-pel-by-3-pel neighborhood surrounding the picture element for which an intensity value is being estimated. For each state, an average intensity value is computed, using one or more representative pictures which are processed using the same pseudo-gray scale algorithm. The average value is stored in the corresponding location in memory 325, and output on lines 345 when addressed. Digital-to-analog converter 350 converts the intensity value to analog form suitable for input to multilevel display 360, which includes suitable buffer and conditioning circuitry internally.

The average intensity values for each state which may occur in the 3-by-3 neighborhood can be generated by constructing a histogram for each representative picture (or group of pictures) which indicates for that state, the frequency of occurrence of different input intensity values. If a state does not occur in a picture, the intensity value for a closely related state can be used. When the frequency of occurrence of more than one intensity value is the same, the values are averaged.

To verify the expected results, the above procedure was performed by computer for the pictures shown in FIG. 2 of an article entitled "Techniques for Coding Dithered Two-Level Pictures", *BSTJ*, Vol. 56, No. 5, page 812, using the 4-by-4 dither matrix described above. A histogram was obtained for each state, using each picture individually and also using the three pictures as a group. A partial tabulation of display bits vs. intensity values obtained by combining data obtained from all three pictures is given in Table 2 below. The display bit patterns were randomly selected, and intensity values for only two different threshold values are shown.

TABLE 2

| THRESHOLD 120 | | THRESHOLD 136 | |
|---|---|---|---|
| Display Bits | Intensity Value | Display Bits | Intensity Value |
| 000000000 | 23 | 000000000 | 21 |
| 000000100 | 29 | 000000010 | 15 |
| 000010111 | 177 | 000001000 | 30 |
| 001000000 | 23 | 000001010 | 52 |
| 001000001 | 41 | 000011000 | 180 |
| 001000100 | 32 | 000011010 | 161 |
| 001000101 | 51 | 000100010 | 30 |
| 001000110 | 42 | 000101000 | 56 |
| 001000111 | 54 | 000101010 | 74 |
| 001010100 | 138 | 000101110 | 66 |
| 001010101 | 150 | 001001000 | 45 |
| 001010110 | 191 | 001011010 | 189 |
| 011000000 | 37 | 010001000 | 63 |
| 011000001 | 114 | 010001010 | 57 |
| 011000101 | 73 | 010011000 | 154 |

To evaluate the intensity estimates obtained from both the individual and the combined representative pictures, the difference between the estimated and actual intensity values was computed for each of the three pictures. The error, called the mean reconstruction error, is presented in Table 3.

TABLE 3

| | PICTURE | | |
|---|---|---|---|
| LOOK-UP TABLE USED | KAREN | ENGINEERING DRAWINGS | HOUSE |
| OPTIMIZED FOR KAREN | 11.8 | 21.5 | 10.7 |
| OPTIMIZED FOR ENGINEERING DRAWING | 16.5 | 14.9 | 17.2 |
| OPTIMIZED FOR HOUSE | 32.5 | 72.0 | 9.8 |
| AVERAGE OF THREE PICTURES | 12.3 | 16.2 | 10.7 |
| NONSTATISTICAL TABLE | 12.7 | 19.8 | 11.1 |

It is clear from Table 3 that there is a significant variation in the accuracy of the estimates from picture-to-picture, when the intensity estimates were derived from one picture. However, much of this variation is a result of certain states not occurring at all in the picture and, therefore, use of an incorrect intensity value. By way of comparison, the mean reconstruction error from picture-to-picture when an average look-up table is used is relatively constant. A non-statistical table computed using the apparatus of FIG. 4 described below produced slightly larger errors. Visual comparison of the original pseudo-gray scale pictures with pictures obtained using the present invention confirms an obvious improvement in quality as a result of better reproduction of gray levels. The improvement is more significant in flat areas of the picture, where the correlation between neighboring picture elements is strong. The edges are also fairly well reproduced in pictures processed with the present invention. An even more significant improvement in quality is noticed when the picture is displayed on a 2:1 interlaced monitor used in standard television. Conventional pseudo-gray scale images obtained by dithering or other similar processing show significant and annoying flicker when viewed under normal lighting conditions in an office. However, since the present technique does not create sharp changes in intensities in adjacent lines, flicker is completely removed.

Since the display processor of FIG. 3 requires a memory 325 that is somewhat large, it may sometimes be desirable to reduce its size by using fewer elements than the nine elements of the 3-by-3 neighborhood 240 shown in FIG. 2. The results of experiments using smaller neighborhoods are given in Table 4, where the configuration of the neighborhood is given along with the size of the memory and the resulting mean absolute error.

TABLE 4

| | | MEAN ABSOLUTE ERROR | | | | | |
|---|---|---|---|---|---|---|---|
| TABLE DESCRIPTION | LOOK TABLE SIZE (BYTES) | KAREN | | ENGINEERING DRAWING | | HOUSE | |
| | | F* | A** | F | A | F | A |
| CENTRAL + 8 ELEMENTS | 8192 | 12.3 | 12.3 | 16.2 | 16.2 | 10.7 | 10.7 |
| CENTRAL + 7 ELEMENTS | 4096 | 12.4 | 12.3 | 16.2 | 16.2 | 10.7 | 10.7 |
| CENTRAL + 6 ELEMENTS | 2048 | 13.3 | 12.9 | 16.9 | 16.7 | 11.3 | 11.0 |
| CENTRAL + 5 ELEMENTS | 1024 | 15.9 | 14.6 | 20.0 | 18.9 | 13.7 | 12.8 |
| CENTRAL + 4 ELEMENTS | 512 | 19.8 | 16.6 | 24.7 | 22.0 | 18.1 | 15.7 |
| CENTRAL + 3 | 256 | 23.4 | 18.7 | 28.4 | 24.1 | 21.8 | 17.8 |

TABLE 4-continued

| | | MEAN ABSOLUTE ERROR | | | | |
|---|---|---|---|---|---|---|
| | | KAREN | | ENGINEERING DRAWING | | HOUSE |
| TABLE DESCRIPTION | LOOK TABLE SIZE (BYTES) | F* | A** | F | A | F | A |
| ELEMENTS | | | | | | | |

*F = Fixed Neighborhood Configuration
**A = Adaptive Neighborhood Configuration

In each case, the intensity values stored in the memory were obtained from histograms using all three representative pictures identified above. In general, two types of neighborhood configurations are used, each of which is a subset of the 3-by-3 neighborhood. In the first, called the "fixed" configuration, the present picture element and a given number of surrounding elements which have threshold values which are numerically close to the threshold value of the central pel are used. In the second, "adaptive", configuration, a different set of neighborhood patterns is used, depending upon whether the central element is "on" or "off". Adaptive processing is illustrated by the following example in which element D3 of FIG. 2 (which has a threshold of 152) is the pel presently being processed. In this example, display bits corresponding to two different sets of three surrounding elements are used in determining the desired intensity estimate: elements E2, C4 and C2, with the next higher thresholds 200, 216, and 232, respectively, are used if the central element is "on", while elements D2, D4 and E3 with next lower thresholds of 104, 88, and 56, respectively, are used when the central element is "off". As a second example, if the present pel and four surrounding elements, are used in an adaptive arrangement, elements E2, C4, C2 and E4 are used if pel D3 is "on", but if it is "off", elements D2, D4, E3 and C3 are used instead. If not enough elements have thresholds which lie above (or below) the threshold of the present pel, other elements from the 3-by-3 neighborhood that are closest in threshold value are used. Table 4 shows the mean absolute error obtained from experiments using both fixed and adaptively neighborhood configurations. The adaptive arrangement always results in a smaller error, but additional logic is required to enable adaptive selection of the neighborhood. The improvement due to adaptive processing shown in Table 4 is borne out by the subjective quality of pictures produced in the experiment.

In some circumstances, it may be advantageous to generate an intensity value estimate for each picture element using an analytical or systematic procedure rather than by using representative pictures. This entirely eliminates the need for memory 325, which is replaced by logic which receives inputs representing the display words for pels in a given neighborhood and information concerning the threshold values for these pels, and generates the estimate as a joint function of these inputs. The estimate desirably minimizes the mean square error or some other error criterion. However, this procedure also is not exact, since it assumes a uniform intensity over a small region of the picture being displayed.

In accordance with this embodiment of the present invention, the desired intensity estimate is computed recursively by successively narrowing the range of possible intensity values. To do this, the N picture elements in the desired neighborhood are first arranged in order of their spatial proximity to the element being processed. Starting with the present element, the display words for these picture elements are denoted by $x_1$, $x_2$, $x_3$ ... $x_N$ and the corresponding thresholds by $T_1$, $T_2$, $T_3$ ... $T_N$, respectively, it again being assumed that a single threshold is used for each pel, and that each display word consists of one bit. An upper bound $U_i$ and a lower bound $L_i$ for the desired intensity value are created, where i is an integer 0, 1, 2, ... N indicating the steps in the recursion, and $U_0 = 255$ and $L_0 = 0$ are initial upper and lower bounds determined by the maximum and minimum possible values for the input intensity signal. In the first step, (i=1) the value of $x_1$ determines which of the bounds is to be changed: if $x_1 = 1$ (indicating that the original intensity of this pel exceeded its threshold $T_1$), then $L_2$ is increased to $T_1$, while $U_1$ remains the same as $U_0$. However, if $x_1 = 0$ (indicating that the original intensity fell below the threshold $T_1$), then $U_2$ is decreased to $T_1 - 1$, while $L_1$ remains the same as $L_0$. This procedure results in a narrowing of the range between $U_i$ and $L_i$ at each iteration, as long as new information not inconsistent with previous information is presented. In the event of inconsistency, the data in that step is ignored. For the $i^{th}$ step, $L_{i-1}$ and $U_{i-1}$ have been established. Three cases can now arise. First, if $T_i < L_{i-1}$, no new information or inconsistent information is obtained for both $x_i = 1$ and $x_i = 0$ and accordingly $L_i$ is set equal to $L_{i-1}$ and $U_i$ is set equal to $U_{i-1}$. Similarly, as a second possibility, if $T_i > U_{i-1}$, then inconsistent or redundant information is obtained for both $x_i = 0$ and $x_i = 1$, and the values for the upper and lower bounds are again not changed, i.e., $L_i = L_{i-1}$ and $U_i = U_{i-1}$. In the third case, $L_{i-1} < T_i < U_{i-1}$. In this case, if $x_i = 0$, this indicates that the original intensity of this pel did not exceed its threshold value. As a result, the lower bound $L_i$ for the intensity estimate is maintained as $L_{i-1}$, while $U_i$ is reduced by setting is equal to $T_{i-1} - 1$. On the other hand, if $x_i = 1$, this indicates that the original intensity exceeded its threshold value. In this event $L_i$ is increased in value to $T_i$, while $U_i$ is maintained at its previous value $U_{i-1}$.

At the end of the desired number of steps, when i is equal to the number N of picture elements contained within the neighborhood being used, a range $[L_N, U_N]$ of possible intensity values exists. The desired value is then taken to be within this range; for example, a simple average $(U_N + L_N)/2$ or a nonlinear weighting scheme could be used.

A block diagram of a display processor arranged to implement the recursive intensity estimating procedure described above is shown in FIG. 4. The processor includes a delay element 430 which may be a shift register or tapped delay line arranged to serially receive display bits from buffer 160 of FIG. 1 and to simultaneously provide the display bits for pels in a desired neighborhood surrounding the presently processed pel, on output lines 430-1 through 430-9. During each estimatation cycle, the contents of delay elements 430 are fixed. When the cycle is completed, a new display bit from buffer 160 is entered in element 430, the neighborhood is appropriately adjusted, and a new cycle is initiated.

During each cycle, the sequence in which the display bits in the neighborhood are processed is determined by a sequencer 400 which controls the position of a selector switch 440. Sequencer 400 receives a sync pulse from buffer 160 on line 401 at the beginning of each cycle and applies a display bit $x_i$ to line 441. Sequencer 400 operates under control of an internal clock to position switch 440 so that display bits are coupled to line 441 in a predefined order. Desirably, the first bit represents the presently processed pel, and succeeding bits in each cycle represent pels nearest to the present pel. Since, for any given operating cycle, a congruent neighborhood is used for processing, sequencer 400 may include a read-only memory programmed to repetitively provide the same series of switch commands. Switch 440 may be implemented as a semiconductor matrix or switch.

The processor of FIG. 4 also includes upper and lower registers 410 and 420, respectively, which are arranged to store the upper and lower bounds $U_i$ and $L_i$ for the intensity estimate being generated. The stores are initialized by a sync pulse from buffer 160 at the beginning of the processing cycle for each picture element, such that $U_0$ and $L_0$, the respective maximum and minimum possible values, are entered therein.

For each display bit processed in an estimation cycle, the contents in stores 410 and 420 are compared with the threshold value $T_i$ which was used to generate that display bit, using a pair of comparators 411 and 421. The appropriate threshold value is derived from a memory 480, which also is controlled by outputs from sequencer 400, so that correspondence is maintained between $x_i$ and $T_i$.

If the threshold value $T_i$ falls between the values of $U_{i-1}$ and $L_{i-1}$, the outputs of comparators 411 and 421 are both high, enabling AND gate 425 to provide a high output which in turn enables first inputs of AND gates 426 and 427. In this event, the value of the display bit $x_i$ determines which threshold value is changed. When $x_i$ is low, the high output of AND gate 426 raises the read enable input of register 410, so that the value $T_{i-1}$ is entered therein. This value is obtained by subtracting the value "1" from the threshold value $T_i$ using subtractor 470. On the other hand, if $x_i = 1$, the output of AND gate 427 is high, raising the read enable input of register 420 and causing $T_i$ to be entered therein. If $T_i$ is outside of the range $U_{i-1}$ to $L_{i-1}$, the output of one of the comparators 411, 421 is low, disabling AND gates 425, 426 and 427. The upper and lower bounds stored in registers 410 and 420 are thus not changed.

When all of the N display bits in the neighborhood have been processed, an END signal is generated by sequencer 400 on line 405 to apply the contents in both registers 410 and 420 to an averager 460. The output of averager 460 is a numerical average of $U_N$ and $L_N$, which serves as the desired intensity estimate. This value is coupled to digital-to-analog converter 350 and thence to multilevel display 360, just as in the arrangement of FIG. 3.

A complete set of threshold values is entered in memory 480, which may be a programmable read-only memory, before processing for a picture is begun. Thereafter, addressing is obtained from sequencer 400, which insures that $T_i$ and $x_i$ correspond. Sequencer 400 may include circuitry similar to threshold value indicator 340 of FIG. 3.

Various modifications and adaptations may be made by those skilled in the art without departing from the spirit and scope of the present invention. For example, the states defined by different combinations of pseudo-gray level signal values (display words) and threshold values may be combined or consolidated so that groups of states which occur infrequently are assigned a single intensity value. This modification can substantially reduce the size of the memory required. Also, it is to be noted that the invention can be used to process the components of a color picture signal by treating each component individually. In such an arrangement, a single memory can be shared, with the intensity value of each component being formed as a joint function of the display words associated with that component as well as one or more threshold values used to form those display words.

If desired, sets of several threshold values can be associated with each element of a picture to be processed, so that each display word consists of several bits. For example, if $T_1$, $T_2$ and $T_3$ represent a set of thresholds of increasing value for a particular pel, display word 00 may indicate that the intensity I of that pel is below $T_1$, while word 01 may indicate that threshold $T_1$ is exceeded but $T_2$ is not. Similarly, word 10 and 11 may indicate that $T_2 < I < T_3$ and $I > T_3$, respectively. Other sets of threshold values are used for other pels, and the different sets are arranged in a spatially dependent matrix. Conventionally, such display words are presented on a multilevel device by assigning to each word a preselected intensity value, independent of which set of threshold values was used to process the pel. In accordance with the present invention, the intensity value is estimated as a joint function of one or more display words for pels in a neighborhood and an indication of the set of thresholds used to form at least one of the words.

What is claimed is:

1. Apparatus for estimating the intensity values of picture elements (pels) in a picture processed by comparing said intensity values of said pels with respective threshold values of said picture elements so as to form a pseudo-gray level signal, comprising:
   means for providing an indication of the threshold values corresponding to said picture elements, and
   means jointly responsive to said threshold value indications and said pseudo-gray level signal for forming said intensity value estimates.

2. The invention defined in claim 1 wherein said jointly responsive means includes:
   memory means adapted to store a plurality of intensity values obtained from representative pictures, each of said stored intensity values representing a different combination of threshold value indications and psuedo-gray level signal values, and
   means for selecting for each of said pels one of said stored intensity values as said estimate of intensity value.

3. The invention defined in claim 1 wherein said jointly responsive means includes:
   means for storing initial upper and lower bounds $U_0$ and $L_0$, respectively, on said intensity value estimate for a presently processed pel,
   means for recursively narrowing the range defined by said bounds in accordance with the threshold values $T_i$ and the pseudo-gray level signal values $x_i$ for a series i=1, 2, 3 ... N of neighborhood pels which lie near said presently processed pel, and means for selecting said intensity value estimate from said narrowed range.

4. The invention defined in claim 3 wherein said range narrowing means is arranged to update the lower and upper bounds $L_{i-1}$ and $U_{i-1}$ for the i-1$^{th}$ neighborhood pel if $$L_{i-1} < T_i < U_{i-1}$$

such that $$U_i = U_{i-1} \text{ and } L_i = T_i \text{ if } x_i = 1$$

and $$L_i = L_{i-1} \text{ and } U_i = T_{i-1} - 1 \text{ if } x_i = 0,$$

where $x_i = 1$ if the intensity value of the i$^{th}$ neighborhood pel exceeds its threshold value $T_i$, and $x_i = 0$ otherwise.

5. Apparatus for processing a pseudo-gray level signal which includes a series of display words associated with respective picture elements (pels) in a picture, said apparatus including:
 (a) means for providing an indication of the display words associated with a group of pels, said group including a particular pel for which an intensity value is being estimated and at least one surrounding pel;
 (b) means for providing an indication of a threshold value used to form at least one of said display words associated with said group of pels; and
 (c) means for generating said intensity value estimate as a joint function of said display words and said threshold value indications.

6. The invention defined in claim 5 wherein said intensity value estimate generating means includes:
 (d) a memory adapted to store for each threshold value a series of intensity values which produce different combinations of display words when a group of representative pictures are processed to form a pseudo-gray level signal, and
 (e) means for addressing said memory to select desired ones of said stored intensity values.

7. The invention defined in claim 5 wherein said intensity value estimate generating means includes:
 means for defining an initial range of possible intensity values, and
 means for successively narrowing upper and lower limits of said range in accordance with the display words $x_i$ and the threshold values $T_i$ for a series i=1, 2 ... N of pels in said group.

8. The invention defined in claim 7 wherein pels in said group are processed in accordance with their spatial proximity to said particular pel.

9. The invention defined in claim 8 wherein $x_i = 1$ when the intensity of the i$^{th}$ pel exceeds $T_i$ and $x_i = 0$ otherwise, and wherein said lower limit of said range is increased to $T_i$ if $x_i = 0$ and said upper limit of said range is decreased to $T_i - 1$ if $x_i = 1$.

10. Apparatus for processing a pseudo-gray level signal representing a picture, said signal being obtained by comparing the intensities of elements of said picture with respective spatially dependent threshold values, said apparatus comprising:

means for providing a signal representing said spatially dependent threshold values, and means for estimating the intensity values of said picture elements as a function of said threshold value signal and said pseudo-gray level signal.

11. The invention defined in claim 10 wherein said estimating means includes means for storing intensity values derived from sample pictures, and means for accessing particular stored values in accordance with said function.

12. The invention defined in claim 11 wherein said accessing means is arranged to select an intensity value for each picture element based on a correspondence between state values associated with elements of said picture to be displayed and said sample pictures, said state values being determined by samples of said pseudo-gray level signal which represent picture elements in a neighborhood and the threshold value used to form at least one of said samples.

13. Apparatus for displaying a pseudo-gray level signal containing a plurality of display bits representing the on-off status of elements of a bilevel picture on a multilevel display device by estimating for each of said picture elements (pels) an intensity value within a predefined range, said pseudo-gray level signal being formed by comparing the intensity value of each element in an original picture with a spatially varying threshold, said apparatus including:
 means for providing display bits representing pels in a region of said picture, wherein said apparatus is characterized by:
 means for providing an indication of the threshold value for at least one of said pels in said region,
 means for estimating each of said intensity values as a function of said threshold value indication and said display bits, and
 means for sequentially applying said estimated intensity values to said multilevel display device.

14. The invention defined in claim 13 wherein said estimating means includes:
 means for storing intensity values typical of picture regions having different combinations of display bits and threshold value indications, and
 means for selecting appropriate stored intensity values.

15. The invention defined in claim 13 wherein said estimating means includes:
 means for storing lower and upper bounds $L_i$ and $U_i$ respectively for said intensity estimate, and
 means for recursively narrowing the range between $L_i$ and $U_i$ in response to the threshold value $T_i$ and the display bit $x_i$ for each of N pels i=1, 2 ... N in said region.

16. The invention defined in claim 15 wherein said narrowing means includes means for adjusting the value of one of said bounds $L_{i-1}$ or $U_{i-1}$ if $L_{i-1} < T_i < U_{i-1}$.

17. The invention defined in claim 16 wherein said narrowing means is arranged to set $L_i = T_i$ if the intensity value of the i$^{th}$ pel exceeded $T_i$ and to set $U_i = T_i - 1$ otherwise.

18. Apparatus for processing a pseudo-gray level signal which includes a series of bits representing the on/off status of associated elements (pels) in a picture, each of said bits being formed as a function of the intensity of the corresponding pel in an original picture and a spatially varying threshold value, said apparatus including:

(a) first means for providing an indication of the on/off status of bits associated with pels in a region of said picture which includes a particular pel for which an intensity estimate is to be generated; and (b) second means responsive to said first means for generating said estimate as a function of said indication and of the threshold value used to form at least one of said associated bits.

19. A method of processing a pseudo-gray level signal representing a picture, said signal being obtained by comparing the intensities of elements of said picture with respective spatially dependent threshold values, said method comprising the steps of:

providing a signal representing said spatially dependent threshold values, and estimating the intensity values of said picture elements as a function of said threshold value signal and said pseudo-gray level signal.

20. The method defined in claim 19 wherein said estimating step includes storing intensity values derived from sample pictures, and accessing particular stored values in accordance with said function.

21. The method defined in claim 20 wherein said accessing step includes selecting an intensity value for each picture element based on a correspondence between state values associated with elements of said picture to be displayed and said sample pictures, said state values being determined by samples of said pseudo-gray level signal which represent picture elements in a neighborhood and the threshold value used to form at least one of said samples.

22. A method of estimating the intensity value of picture elements (pels) of a pseudo-gray level picture, including:

generating a state value indication for each picture element as a joint function of (a) the on/off condition of elements in said pseudo-gray level picture which lie in a region which surrounds said picture element, and (b) the spatial location of said pel within a threshold value matrix used to generate said pseudo-gray level picture, storing an average intensity value for each possible state value produced using representative pictures, and selecting as said estimate a particular one of said stored values in response to said state value indication.

23. A method of conditioning a pseudo-gray level signal for display on a multilevel display device, said signal including a series of display bits representing the on/off status of associated elements (pels) of a picture, said method including the steps of (1) estimating the intensity of each pel and (2) sequentially applying said estimates to said display device, wherein said estimating step is characterized by generating a signal indicating the threshold values used to produce at least one of the display bits which represent a group of picture elements;

storing a series of intensity values obtained from representative pictures, and retrieving one of said stored values in response to said threshold value indication and said display bits which represent said group of pels.

* * * * *